United States Patent
Rios

(10) Patent No.: US 10,848,207 B2
(45) Date of Patent: Nov. 24, 2020

(54) METHODS AND APPARATUS FOR ORTHOGONAL STREAM SPATIAL MULTIPLEXING

(71) Applicant: Carlos A. Rios, Sunnyvale, CA (US)

(72) Inventor: Carlos A. Rios, Sunnyvale, CA (US)

(*) Notice: Subject to any disclaimer, the term of this patent is extended or adjusted under 35 U.S.C. 154(b) by 0 days.

(21) Appl. No.: 16/379,692

(22) Filed: Apr. 9, 2019

(65) Prior Publication Data

US 2020/0280347 A1    Sep. 3, 2020

Related U.S. Application Data

(60) Provisional application No. 62/812,925, filed on Mar. 1, 2019.

(51) Int. Cl.
H04B 7/0413  (2017.01)
H04B 7/10    (2017.01)
(Continued)

(52) U.S. Cl.
CPC .......... *H04B 7/0413* (2013.01); *H04B 7/024* (2013.01); *H04B 7/04* (2013.01); *H04B 7/043* (2013.01);
(Continued)

(58) Field of Classification Search
CPC .. H04B 7/0626; H04B 7/0617; H04B 7/0417; H04B 7/0478; H04B 7/0639; H04B 7/0413; H04B 7/0469; H04B 7/10; H04B 7/0452; H04B 7/0632; H04B 7/06; H04B 7/0695; H04B 7/0634; H04B 7/04; H04B 7/024; H04B 7/0408; H04B 7/0619; H04B 7/0689; H04B 7/0697; H04B 7/043;
(Continued)

(56) References Cited

U.S. PATENT DOCUMENTS

2007/0047678 A1*  3/2007  Sibecas ............... H04B 1/7115
                                                    375/343
2009/0197544 A1*  8/2009  Petersson ............. H04B 7/10
                                                    455/73
(Continued)

*Primary Examiner* — Fred A Casca
(74) *Attorney, Agent, or Firm* — Intellectual Property Law Group LLP

(57) ABSTRACT

Methods and apparatus for orthogonal stream spatial multiplexing. In one embodiment, a method includes splitting and modulating a data stream into n MIMO RF spatial streams and coupling them to corresponding switchable polarization antenna elements controlled via orthogonal binary codes for transmission. Each transmitted stream manifests as time-varying-polarization-orthogonal to the other n−1 spatial streams. The method includes reception of the streams at their destination using corresponding antenna elements controlled by the same set of orthogonal codes. Thus, each of the n transmitted spatial streams is polarization-match-filtered, unambiguously separated and individually recovered from all the others upon reception for subsequent demodulation and MIMO spatial recombination into the original data stream. Thus, n MIMO spatial streams emanating from a common source and featuring equal amplitude and bandwidth but bearing distinct data and exhibiting mutually orthogonal time varying polarization will propagate mutually interference-free on the same frequency channel to a single destination.

20 Claims, 5 Drawing Sheets

(51) Int. Cl.
| | |
|---|---|
| *H04B 7/06* | (2006.01) |
| *H04B 7/0417* | (2017.01) |
| *H04B 7/0456* | (2017.01) |
| *H04B 7/0452* | (2017.01) |
| *H04B 7/04* | (2017.01) |
| *H04B 7/024* | (2017.01) |
| *H04B 7/0408* | (2017.01) |
| *H04B 7/0426* | (2017.01) |
| *H04B 7/08* | (2006.01) |
| *H04B 7/17* | (2006.01) |

(52) U.S. Cl.
CPC ......... *H04B 7/0408* (2013.01); *H04B 7/0417* (2013.01); *H04B 7/0452* (2013.01); *H04B 7/0469* (2013.01); *H04B 7/0478* (2013.01); *H04B 7/06* (2013.01); *H04B 7/068* (2013.01); *H04B 7/0617* (2013.01); *H04B 7/0619* (2013.01); *H04B 7/0626* (2013.01); *H04B 7/0632* (2013.01); *H04B 7/0634* (2013.01); *H04B 7/0639* (2013.01); *H04B 7/0695* (2013.01); *H04B 7/0697* (2013.01); *H04B 7/0897* (2013.01); *H04B 7/10* (2013.01); *H04B 7/17* (2013.01)

(58) Field of Classification Search
CPC ........ H04B 7/088; H04B 1/40; H04B 7/0608; H04B 7/02; H04W 24/10; H04W 16/28; H04W 4/026
See application file for complete search history.

(56) References Cited

U.S. PATENT DOCUMENTS

2012/0162008 A1\* 6/2012 Eom ................. H04B 7/10
                                                            342/361
2017/0373743 A1\* 12/2017 Park ............... H04L 25/0204

\* cited by examiner

METHODS AND APPARATUS FOR ORTHOGONAL STREAM SPATIAL MULTIPLEXING

PRIORITY

This application claims the benefit under 35 U.S.C. § 119 of U.S. Provisional Application No. 62/812,925, filed on Mar. 1, 2019, and entitled "METHODS AND APPARATUS FOR ORTHOGONAL STREAM SPATIAL MULTIPLEXING," which is incorporated herein by reference in its entirety.

FIELD

The exemplary embodiments of the present invention relate to the field of telecommunications. More specifically, the exemplary embodiments of the present invention relate to the operation of wireless communication networks.

BACKGROUND

With the rapidly growing trend for mobile and remote fixed data access over high-speed communication networks, increasing the number of users as well as the amount of data those users consume has become of primary importance. Long Term Evolution (LTE) Fourth Generation (4G) cellular networks, for example, currently utilize multiple-input-multiple-output (MIMO) techniques that have significantly increased available mobile capacity over that of their non-MIMO predecessors. However, the projected demand for wireless bandwidth even in the relatively near future far exceeds what even the highly touted next generation Fifth Generation (5G) technology can practically provide.

Therefore, a mechanism that can vastly increase the data transfer capacity of wireless communications networks is extremely desirable.

SUMMARY

The following summary illustrates simplified versions of one or more aspects of the present invention. The purpose of this summary is to present key concepts in a simplified manner pending more detailed descriptions later.

In various exemplary embodiments, methods and apparatus for orthogonal stream spatial multiplexing ("OSSM") are provided that would greatly expand wireless network data transfer capacity. In an exemplary embodiment, an "Originating Data Stream" requiring wireless communication to a remote destination is input to an OSSM-capable transmitter. The data stream is therein split, encoded and modulated into n Tx spatial streams by a MIMO transmitter. The spatial streams are then fed to n corresponding Tx "OSSM Apparatus" that actually perform the transmit-side orthogonal stream spatial multiplexing. An "OSSM Tx Method" causes the n distinct Tx OSSM Apparatus to toggle the instantaneous polarization of each of the n Tx spatial streams in a mutually orthogonal time varying manner. The n resulting "OSSM spatial streams" (each carrying distinct data and exhibiting unique orthogonal time-varying polarization but otherwise featuring identical amplitude, modulation and frequency channelization) are then launched wirelessly to the desired destination.

The n radiated OSSM spatial streams impinge upon n corresponding Rx OSSM Apparatus (that actually perform the receive-side orthogonal stream spatial de-multiplexing) at the destination OSSM-capable receiver. An "OSSM Rx Method" varies the instantaneous polarization of each of the n Rx OSSM Apparatus in a manner conforming identically to that of the corresponding Tx OSSM Apparatus in order to produce a "matched polarization filter" that passes only one of then OSSM spatial streams, and rejects the n−1 others. This allows the destination MIMO receiver to effectively separate the n equal amplitude-and-modulation, co-channel received spatial streams, unambiguously recover each stream independently, and subsequently demodulate them all and aggregate into the Original Data Stream.

A significant benefit of this OSSM invention is its ability to wirelessly transmit an arbitrarily large number n of spatial streams (each carrying distinct data but otherwise featuring identical RF amplitude and modulation) on the same frequency channel to the same destination, effectively multiplying the "nominal" data transfer capacity of any such communications link by a factor of n. Existing MIMO Spatial Multiplexing techniques can only guarantee a 2× data transfer (and in practice deliver a maximum 4× only under very special circumstances) regardless of the MIMO Spatial Multiplexing order n employed. Another significant benefit of this invention is that in many embodiments it may manifest as an "overlay" atop existing MIMO transceiver hardware, and specifically not require extremely costly and time-consuming modifications to radio silicon.

In an embodiment, an apparatus is provided that comprises one or more transmit antenna circuits connected to receive one or more spatial streams and one or more orthogonal polarization control signals, respectively. Each spatial stream is associated with a corresponding polarization control signal. Each transmit antenna circuit comprises first and second orthogonally polarized transmit antennas and a switch that selectively connects a selected spatial stream to the first and second orthogonally polarized RF transmit antennas based on the corresponding polarization control signal.

In an embodiment, an apparatus is provided that comprises one or more receive antenna circuits that receive one or more RF spatial streams and one or more orthogonal polarization control signals, respectively. Each RF spatial stream is associated with a corresponding polarization control signal. Each receive antenna circuit comprises first and second orthogonally polarized receive antennas and a switch that selectively connects outputs of the first and second orthogonally polarized RF receive antennas to a receiver based on the corresponding polarization control signal.

In an embodiment, a method is provided that comprises radiating a plurality of RF spatial streams. Each RF spatial stream comprises time-varying polarization that is orthogonal to other RF spatial streams. The method also comprises receiving the plurality of RF spatial streams at a plurality of receive antennas. Each receive antenna comprises first and second orthogonally polarized antenna elements having outputs that are selectively connected to a receiver to match the polarization of a selected received RF spatial stream.

Additional features and benefits of the exemplary embodiments of this invention will become apparent from the description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
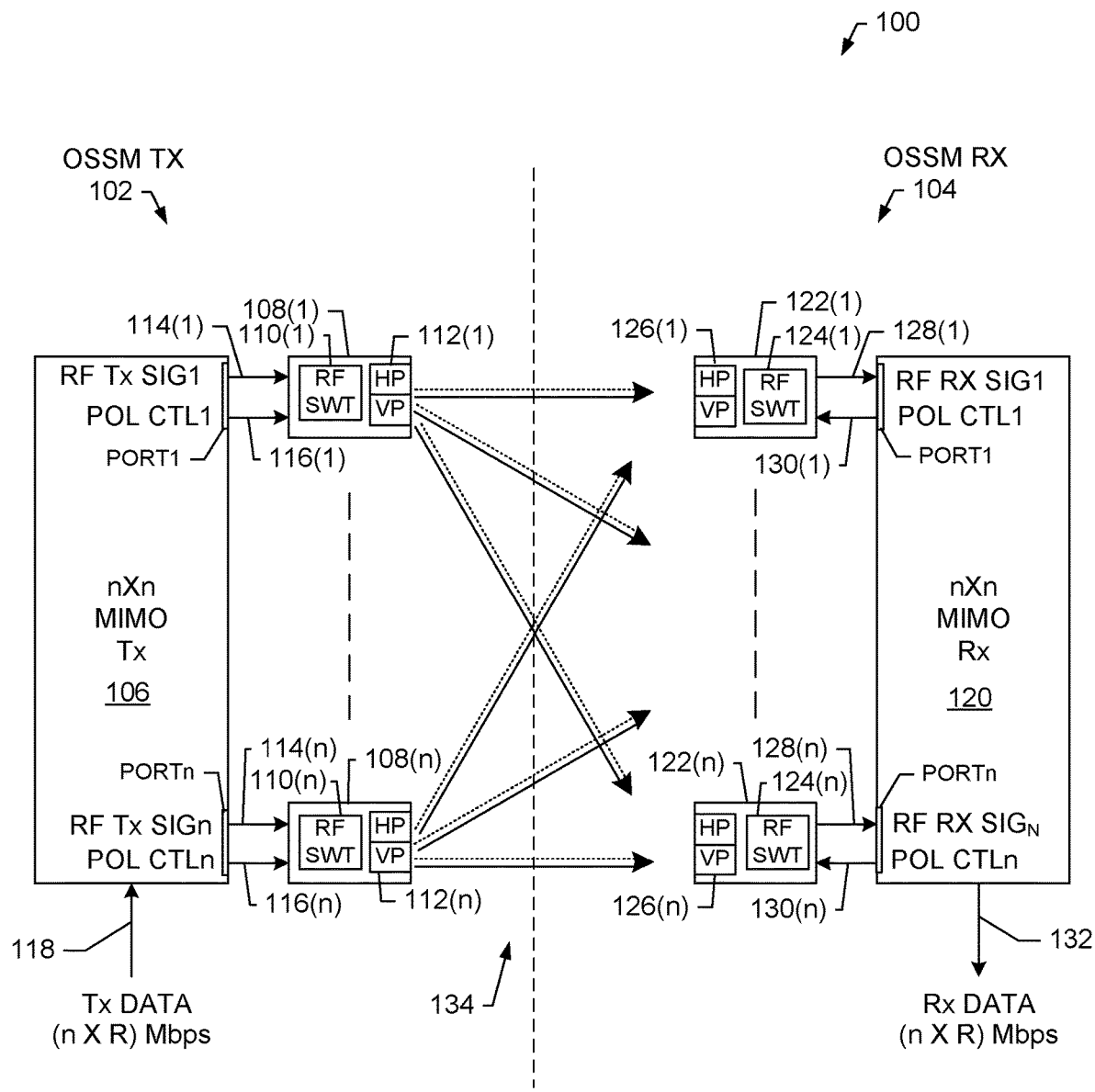
FIG. 1 shows a communication network comprising an exemplary embodiment of a transmitter and an exemplary embodiment of a receiver that together perform orthogonal stream spatial multiplexing.

Aspects of the present invention are described here in the context of methods and/or apparatus for orthogonal stream spatial multiplexing.

The purpose of the following detailed description is to provide a thorough understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a wireless communications network 100 comprising an exemplary embodiment of an OSSM transmitter ("OSSM Tx") 102 and an exemplary embodiment of an OSSM receiver ("OSSM Rx") 104 that together perform orthogonal stream spatial multiplexing.

Transmitter Description

The OSSM Tx 102 comprises an $n^{th}$ order MIMO Spatial Multiplexing-enabled transmitter ("MIMO Tx") 106 and a plurality of (n) transmitter antenna circuits 108(1-n) (also referred to herein as "Tx OSSM Apparatus") that each comprise an RF switch 110(1-n) and a dual polarization Tx antenna 112(1-n). For example, each dual polarization Tx antenna provides horizontal polarization (HP) and vertical polarization (VP). In an embodiment, the MIMO Tx 106 receives a data stream 118 having a data rate of (n×R) Mbps. The MIMO Tx 106 splits the received data stream 118 into n spatial streams each having a data rate of (R) Mbps.

The MIMO Tx 106 provides n Tx ports (PORT1-n), and each port is connected directly to an RF switch 110 of a corresponding a transmitter antenna circuit 108. Each RF switch 110 receives from the MIMO Tx 106 an RF transmit signal 114 at a common input and a corresponding polarity control signal 116 at a control input. The RF switch 110 features two outputs that are selectively connected to the common input in response to the control signal 116. The two outputs are connected to two orthogonally polarized elements of the dual polarization transmit antenna 112. A first output of the RF switch 110 is connected to the vertical polarization (VP) element of the transmit antenna 112. A second output of the RF switch 110 is connected to the horizontal polarization (HP) element of the transmit antenna 112. In a similar manner, each of the RF switches 110 connected to MIMO Tx 106 are connected to vertical and horizontal polarization elements of their respective dual polarization Tx antennas.

During the transmit operation, a data stream 118 is input to the MIMO Tx 106 and therein split, coded and modulated into n distinct spatial streams. Each spatial stream is routed to a corresponding RF switch 110 of a transmit antenna circuit 108 along with a polarization control signal 116. The polarization control signal 116 controls how the RF switch 110 connects the spatial stream at its data input to the vertical and horizontal polarization elements of the corresponding dual polarization transmit antenna 112. The polarization control signals 116 are configured to time-vary the instantaneous polarization of a given spatial stream according to a distinct $n^{th}$ order orthogonal binary code so that the resulting transmitted RF completely de-correlates (i.e., switches its polarization orthogonally over time) with respect to every other transmitted spatial stream, regardless of the physical paths 134 the streams actually traverse.

Receiver Description

The OSSM Rx 104 contains an analogous $n^{th}$ order MIMO Spatial Multiplexing-enabled receiver ("MIMO Rx") 120 and a plurality of (n) receiver antenna circuits 122(1-n) (also referred to herein as "Rx OSSM Apparatus") that each comprise an RF switch 124(1-n) and a dual polarization Rx antenna 126(1-n). Each RF switch 124 receives RF signals at two inputs from the vertical and horizontal polarization elements, such as from antenna 126 within OSSM Rx Apparatus 122. A first input to the RF switch 124 is connected to a vertical polarization (VP) element of the receive antenna 126. A second input of the RF switch 124 is connected to a horizontal polarization (HP) element of the receive antenna 126. In a similar manner, each of the RF switches of the receiver antenna circuits 122(1-n) are connected to vertical and horizontal polarization elements of their respective dual polarization receive antenna elements.

During the receive operation, the MIMO Rx 120 provides distinct polarization control signals to each of the n receiver antenna circuits 122(1-n). Each particular receiver antenna circuit's polarization control signal sequence 130 as generated by MIMO Rx 120 is identical to the corresponding transmitter antenna circuit's $n^{th}$ order orthogonally coded control signal provided by the MIMO Tx 106. Thus, the n distinct polarization control signals used at both OSSM Tx 102 and OSSM Rx 104 effectively synthesize n "matched polarization filter" pairs that individually pass to MIMO Rx 120 only their corresponding time varying polarized spatial stream, and block all others. The resulting n received unambiguously separated and individually recovered RF spatial streams are then demodulated by the receiver 120 and aggregated to form the final Rx data stream 132, corresponding identically to the original Tx data stream 118.

Figure 2:
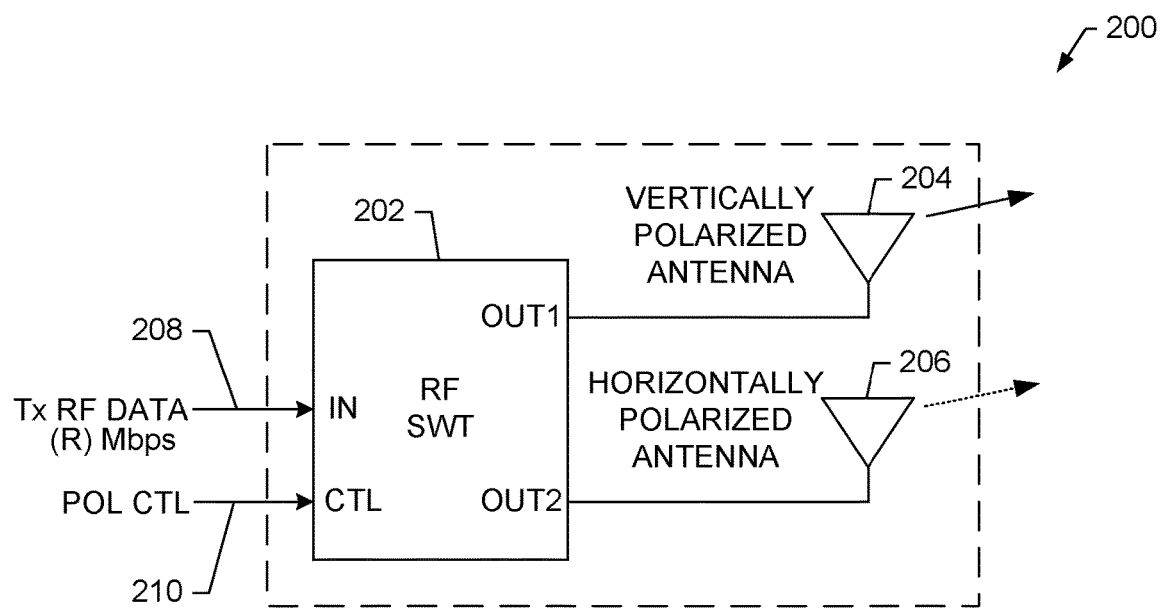
FIG. 2 shows an exemplary detailed embodiment of a transmit antenna circuit.

FIG. 2 shows an exemplary detailed embodiment of a transmit antenna circuit 200 (also referred to herein as "Tx OSSM Apparatus"). For example, the transmit antenna circuit 200 is suitable for use as any of the transmit antenna circuits 108(1-n) shown in FIG. 1. The transmit antenna circuit 200 comprises an RF switch 202, a vertically polarized antenna element 204, and a horizontally polarized antenna element 206.

The RF switch 202 comprises an input port (IN), a control port (CTL), and two output ports (OUT1, OUT2). The RF switch 202 receives a spatial stream of RF data to be transmitted 208 at the input port IN. A polarization control signal 210 is received at the control port CTL. The polarization control signal 210 comprises a binary stream of control bits. Each bit determines whether the input port IN is connected to the first output port OUT1 or the second output port OUT2. For example, when a polarity control bit is in a high or logic 1 state, the input port IN is connected to the first output port OUT1. When a polarity control bit is in a low or logic 0 state, the input port IN is connected to the second output port OUT2. Thus, the polarity control signal 210 determines how the spatial stream 208 of RF data to be transmitted is routed to the vertically polarized antenna 204 and the horizontally polarized antenna 206 for transmission.

Figure 3:
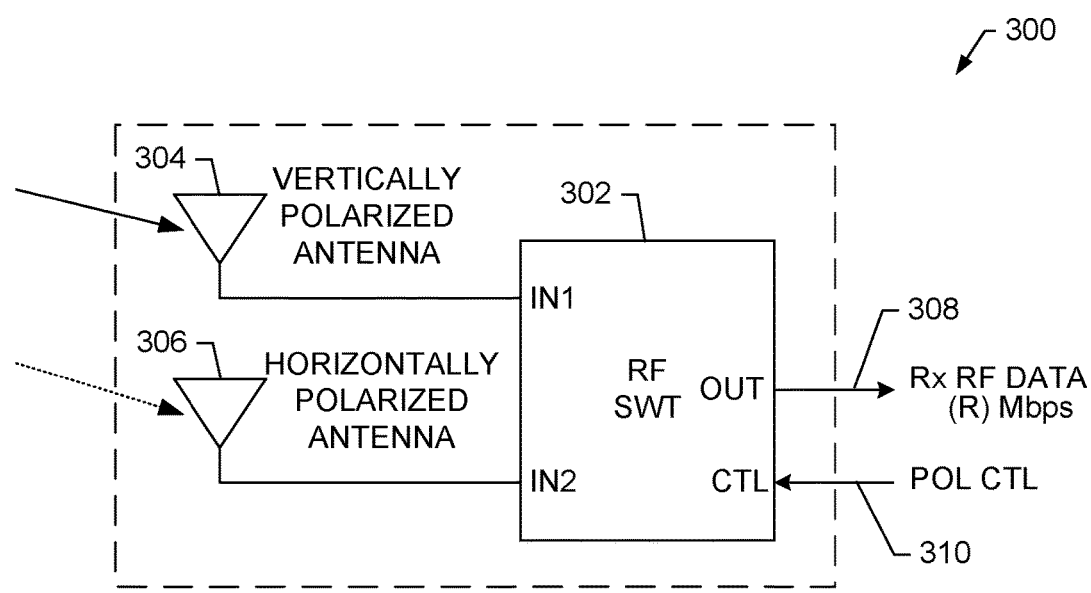
FIG. 3 shows an exemplary detailed embodiment of a receive antenna circuit.

FIG. 3 shows an exemplary detailed embodiment of a receive antenna circuit 300 (also referred to herein as "Rx OSSM Apparatus"). For example, the receive antenna circuit 300 is suitable for use as any of the receive antenna circuits 122(1-n) shown in FIG. 1. The receive antenna circuit 300 comprises an RF switch 302, a vertically polarized antenna 304, and a horizontally polarized antenna 306.

The RF switch 302 comprises an output port (OUT), a control port (CTL), and two input ports (IN1, IN2). The vertically polarized antenna element 304 receives RF signals and inputs these signals to the first input port IN1 of the RF switch 302. The horizontally polarized antenna element 306 receives RF signals and inputs these signals to the second input port IN2 of the RF switch 302. A polarization control signal 310 is received at the control port CTL. The polarization control signal 310 comprises a binary stream of control bits. Each bit determines whether the first input port IN1 or the second input port IN2 is connected to the output port OUT. For example, when a polarity control bit is in a high or logic 1 state, the first input port IN1 is connected to the output port OUT. When a polarity control bit is in a low or logic 0 state, the second port IN2 is connected to the output port OUT.

During operation, the polarity control signal 310 selectively connects one of the first input port IN1 and the second input port IN2 to the output port OUT. Since the polarity control signal 310 is synced with a corresponding signal used at a MIMO transmitter, switching between the vertically and horizontally polarized antennas completes a matched filter that result in a single transmitted RF signal being received and provided at the output port OUT as the received RF spatial stream data 308.

Figure 4:
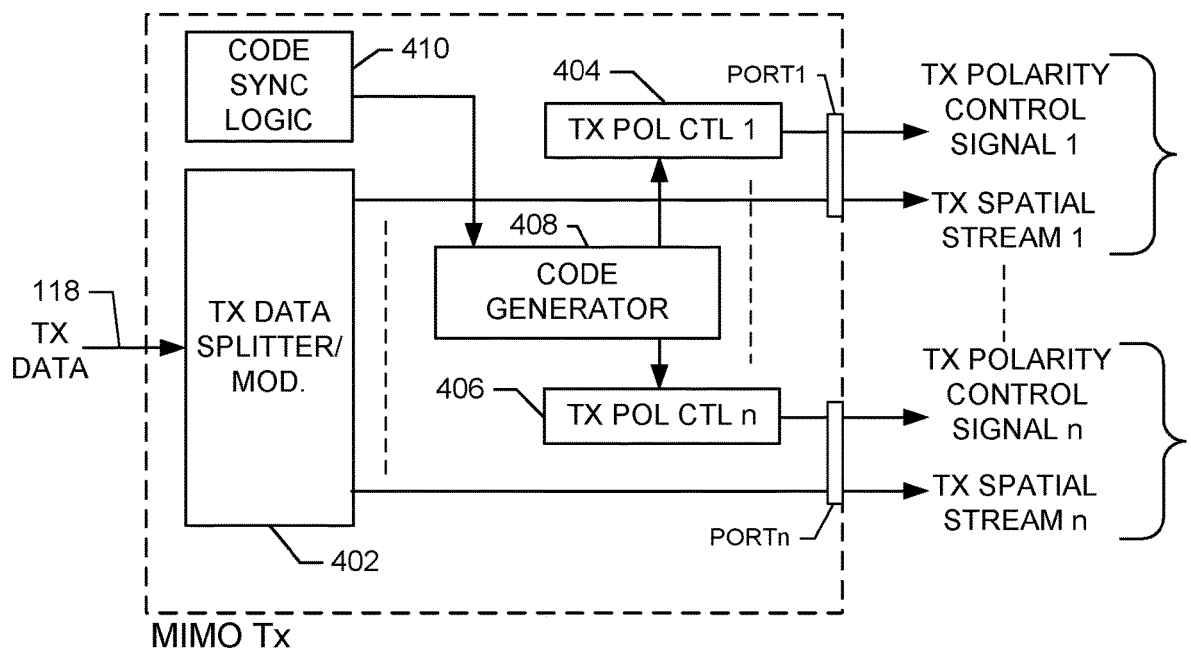
FIG. 4 shows an exemplary detailed embodiment of at least a portion of a MIMO Tx shown in FIG. 1.

FIG. 4 shows an exemplary detailed embodiment of at least a portion of the MIMO Tx 106 shown in FIG. 1. MIMO Tx 106 comprises data splitter/modulator 402, polarity controller 1 404 through polarity controller n 406, code generator 208, and code sync logic 410.

During operation, transmit data stream 118 is input to the data splitter 402, which splits, encodes and modulates the data into n distinct MIMO RF spatial streams (Tx spatial stream 1-n). The streams are output through PORT(1-n) to RF switches (not shown) of transmit antenna circuits (e.g., circuits 108). The code generator 408 generates n orthogonal binary codes that are input to polarity controllers 404(1-n). These controllers output their binary codes to the RF switches of transmit antenna circuits. For example, polarity control signal 1 and spatial stream 1 are output from PORT(1) and input to the RF switch of the first transmit antenna circuit 108(1). Polarity control signal n and spatial stream n are similarly output from PORT(n) and input to the RF switch of the $n^{th}$ transmit antenna circuit 108(n). In this fashion, the RF switch of each transmit antenna circuit is supplied with a polarization control code that steers the spatial stream through the dual polarization antenna's appropriate vertical or horizontal antenna element, thereby generating one distinct instantiation of n orthogonal time-varying-polarized radiated spatial streams.

In an embodiment, code sync logic 410 operates to synchronize the polarization control codes between the OSSM transmitter 102 and the OSSM receiver 104. In an embodiment, polarity code timing corresponds to an integer fraction of the transmitted stream's payload symbol rate. During operation, the MIMO receiver 120 precisely recovers the payload symbol rate, which is referred to as "symbol synchronization." Once the MIMO receiver achieves symbol synchronization it can use this synchronization to achieved polarity code synchronization at the receiver. Thus, in one embodiment, the code sync logic 410 syncs the code generator 408 based on symbol synchronization so that the receiver can achieve the same synchronization for its code generation as done in the transmitter.

Figure 5:
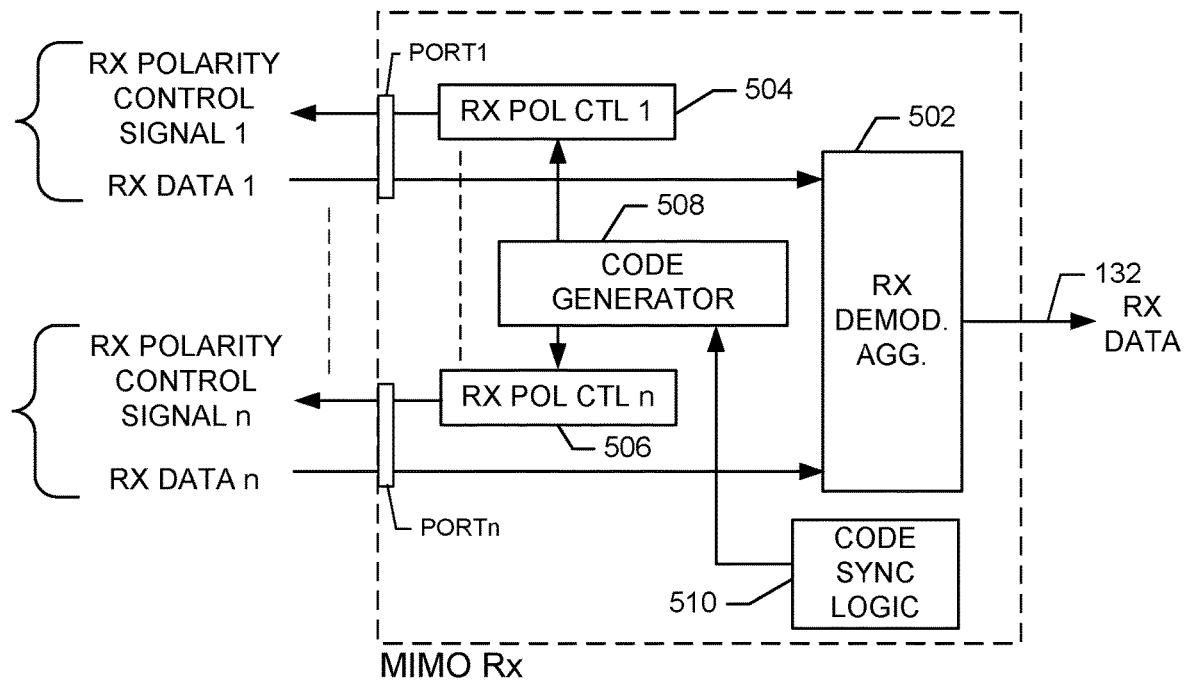
FIG. 5 shows an exemplary detailed embodiment of at least a portion of the MIMO Rx shown in FIG. 1.

FIG. 5 shows an exemplary detailed embodiment of at least a portion of the MIMO Rx 120 shown in FIG. 1. MIMO Rx 120 comprises Rx demodulator/aggregator 502, polarity controller 1 504 through polarity controller n 506, code generator 508, and code sync logic 510.

During operation, the code generator 508 provides polarization control signals to the polarization controller 1 504 through n 506. The polarization control signals generated by the code generator 508 correspond precisely to the polarization control signals generated in MIMO Tx 106 by the code generator 408. Signals output from the code generator 508 control how the n receiver antenna circuits 122 each "polarization-filter" the aggregated received spatial streams they receive into single, distinct, unambiguously separated and recovered individual spatial streams for input to the Rx demodulator/aggregator 502 of MIMO Rx 120. Each receiver antenna circuit varies its instantaneous Rx polarization according to the identical $n^{th}$ order orthogonal code employed at its corresponding transmitter antenna circuit. In this fashion, only the $m^{th}$ transmitted spatial stream (radiated from the transmitter antenna circuit m with time-varying polarization in accordance with the $m^{th}$ orthogonal binary code) will propagate through the $m^{th}$ receiver antenna circuit (whose polarization also time-varies in accordance with orthogonal binary code m) to Rx demodulator 502. The n distinct received spatial streams are then demodulated in 502 and aggregated to form Rx Data stream 132.

In an embodiment, the code sync logic 510 operates to synchronize the polarization control codes between the OSSM transmitter 102 and the OSSM receiver 104. In an embodiment, polarity code timing corresponds to an integer fraction of the transmitted stream's payload symbol rate. During operation, the MIMO receiver 120 precisely recovers the payload symbol rate, which is referred to as "symbol synchronization." Once the MIMO receiver achieves symbol synchronization it can use this synchronization to achieved polarity code synchronization at the receiver. Thus, in one embodiment, the code sync logic 510 syncs the code generator 508 based on symbol synchronization so that the receiver can achieve the same synchronization for its code generation as done in the transmitter.

Figure 6:
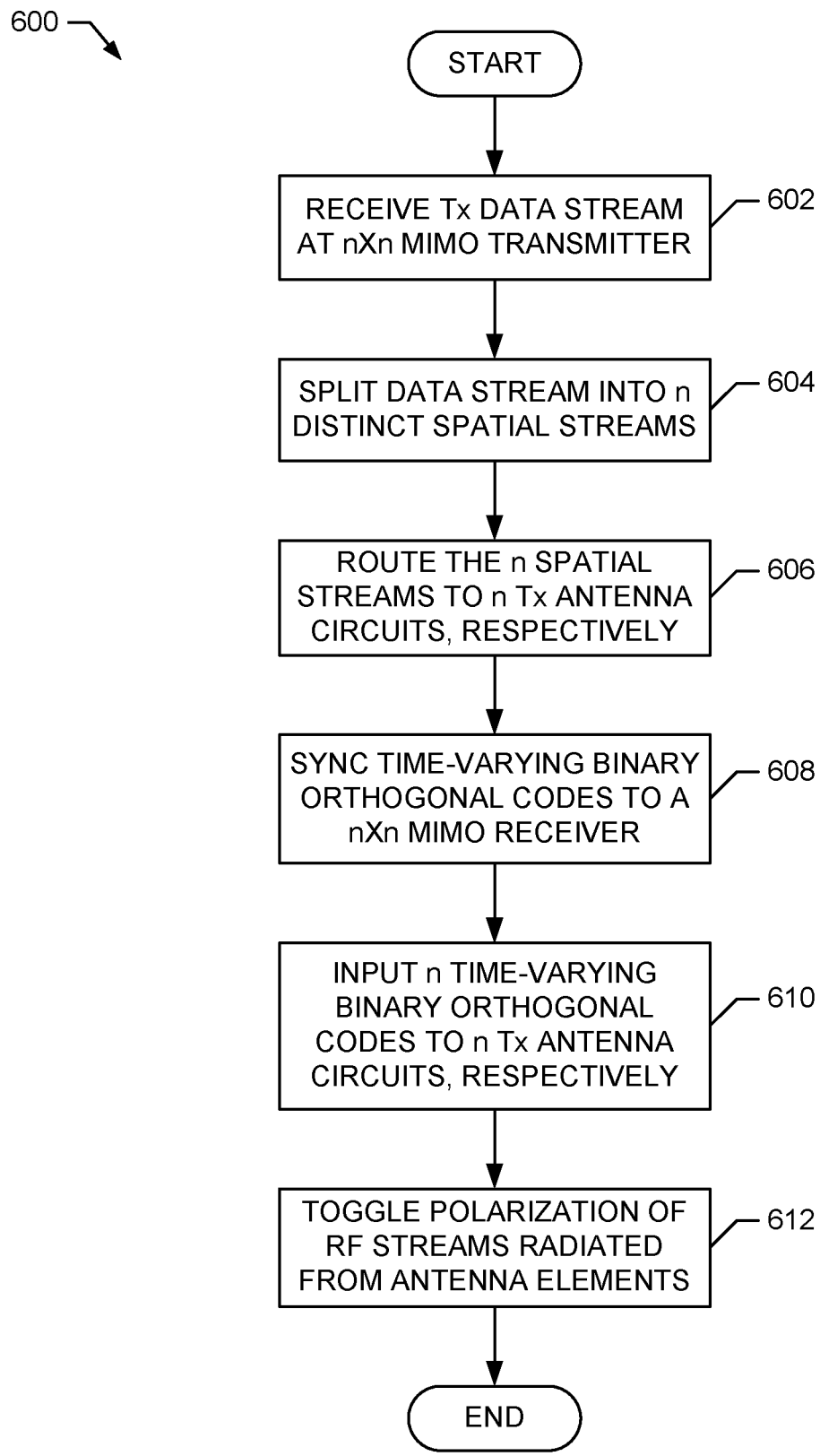
FIG. 6 shows a method for performing orthogonal stream spatial multiplexing in accordance with one embodiment of the present invention.

FIG. 6 shows a method 600 for performing orthogonal stream spatial multiplexing in accordance with one embodiment of the present invention. For example, in an exemplary embodiment, the method 600 is suitable for use by OSSM Tx 102 shown in FIG. 1.

At block 602, a Tx Data stream (with data rate n×R Mbps) is input to an n×n MIMO Spatial Multiplexing-enabled transmitter. For example, the data stream 118 is input to the MIMO Tx 106.

At block 604, the Tx data stream is split, encoded and modulated into n distinct spatial streams. For example, the Tx data splitter/modulator 402 processes the received Tx data stream 118 into n distinct spatial streams as shown in FIG. 4.

At block 606, the n distinct spatial streams are routed to corresponding Tx antenna circuits. For example, as shown in FIG. 1, each spatial stream is routed to a corresponding Tx antenna circuits (e.g., 108) comprising an SPDT RF Switch (e.g., 110) with its 2 outputs routed to the orthogonally polarized radiating elements of a selectable polarization antenna (e.g., 112) and controlled by a binary control signal (e.g., 116)

At block 608, a synchronization process is performed to sync the generation of the orthogonal codes. In one embodiment, the code sync logic 410 syncs the code generator 408 based on symbol synchronization so that a MIMO receiver can achieve the same synchronization for its code generation as provided in the MIMO transmitter.

At block 610, distinct time-varying binary $n^{th}$ order orthogonal codes are input to each of the Tx antenna circuits. For example, the code generator 408 generates the n time-varying binary orthogonal codes (e.g., 116) that would independently toggle the polarization of the n distinct spatial streams (e.g., 114) as they traverse their corresponding Tx antenna circuit (e.g., 108).

At block 612, the instantaneous polarizations of the n spatial streams radiated from the n Tx antenna circuits (e.g., 108) are toggled based on their corresponding time-varying binary orthogonal polarization control code (e.g., 116).

Thus, the method 600 operates to perform orthogonal stream multiplexing in accordance with one embodiment of the present invention. It should be noted that the operations of the method 600 are exemplary and not exhaustive. In various embodiments, the operations may be rearranged, modified, deleted, add to, or modify in other ways in accordance with the embodiments.

Figure 7:
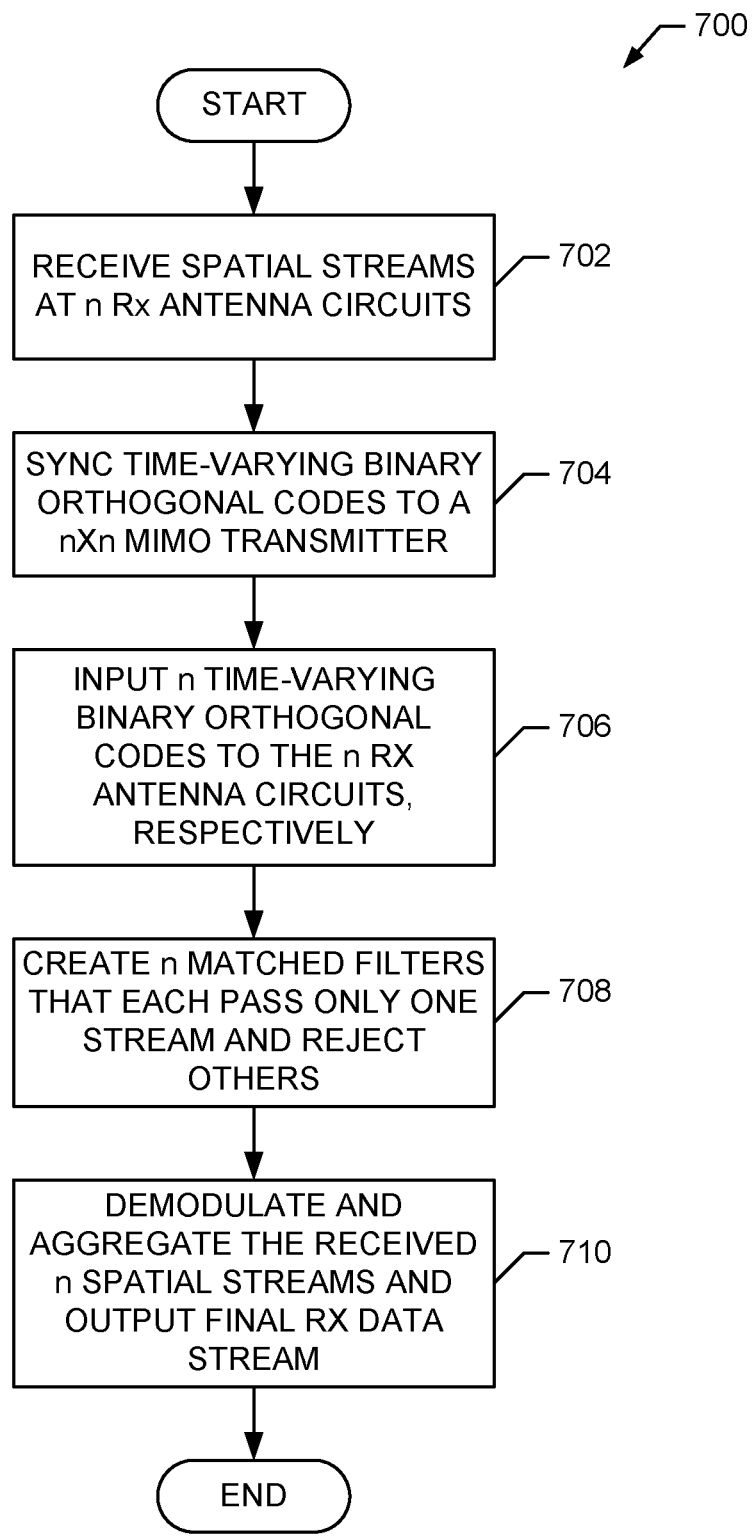
FIG. 7 shows a method for performing orthogonal stream spatial de-multiplexing in accordance with one embodiment of the present invention.

FIG. 7 shows a method 700 for performing orthogonal stream spatial de-multiplexing in accordance with one embodiment of the present invention. For example, in an exemplary embodiment, the method 700 is suitable for use by MIMO Rx 120 shown in FIG. 1.

At block 702, n aggregated MIMO RF spatial streams impinge upon antennas of n Rx antenna circuits of a MIMO receiver. For example, the spatial streams 134 generated by OSSM Tx 101 are received at the n Rx antenna circuits (e.g., 122) of the OSSM Rx 104.

At block 704, a synchronization process is performed to sync the generation of orthogonal codes to those of a MIMO transmitter. In one embodiment, the code sync logic 510 syncs the code generator 508 based on symbol synchronization so that a MIMO receiver can achieve synchronization of its code generation to that of a MIMO transmitter.

At block 706, distinct time-varying binary nth order orthogonal codes are input to each of the n Rx antenna circuits. For example, the code generator 508 within MIMO Rx 120 generates the n time-varying binary orthogonal codes 130 input to corresponding Rx antenna circuits 122.

At block 708, the time-varying orthogonal codes from code generator 508 toggle the instantaneous polarization of n Rx antenna circuits, thereby creating n distinct "matched polarization filters" that each pass only the one received RF spatial stream exhibiting the identical time varying polarization as that particular Rx antenna circuit, and reject all others. For example, with the aggregated received spatial streams 134 impinging on all Rx antenna circuits 122 concurrently, and with Rx Polarization Control signal 130(1) (manifesting $n^{th}$ order binary orthogonal code 1) only the received spatial stream transmitted from OSSM Tx Apparatus 1 108(1) (also time varying polarized according to $n^{th}$ order orthogonal binary code 1) will successfully traverse the time varying polarization filter manifest in OSSM Rx Apparatus 122(1), and propagate (as 128(1)) to MIMO receiver 120. All the other n−1 received RF spatial streams contained in 134 will be blocked within the Rx antenna circuit 122(1).

At block 710, the n unambiguously separated and individually recovered receive spatial streams managing to successfully traverse the set of OSSM Rx Apparatus are demodulated by the MIMO receiver and then aggregated and output as a single received Rx Data stream. For example, the Rx demodulator/aggregator 302 inputs OSSM Rx Apparatus 119's output RF spatial stream 124, demodulates it into an R Mbps data stream and then aggregates it with the n−1 other demodulated spatial streams into a single n×R Mbps Rx Data stream 108.

Thus, the method 700 operates to perform orthogonal stream spatial de-multiplexing in accordance with one embodiment of the present invention. It should be noted that the operations of the method 700 are exemplary and not exhaustive. In various embodiments, the operations may be rearranged, modified, deleted, add to, or modify in other ways in accordance with the embodiments.

In various embodiments, as there are a vast number of possible physical switchable polarization antenna element types, each with perhaps a few distinct mechanisms for switching between orthogonal (H-V or RHCP-LHCP) polarizations, there are countless ways to change/substitute specific physical components without changing the basic operations as described herein.

Exemplary Implementations

In various exemplary embodiments, adding the described OSSM methods and apparatus to an n-stream MIMO spatial multiplexing-configured radio will yield a Tx/Rx data rate up to n times that of a single stream.

In an embodiment, apparatus and methods are provided for arbitrarily large data transfer rate in a MIMO Spatial Multiplexing-enabled radio transceiver, and which comprise:

1. "MIMO Xcvr Apparatus" capable of coding, modulating and transmitting as well as receiving, demodulating and decoding an Originating Data Stream of rate m×R b/s into and from m spatial streams (although limited in practice to a maximum m=2, and an actually achievable data transfer rate of 2×R), and 2. "OSSM Apparatus" for orthogonal stream spatial mux/demux comprising: an antenna element (the "OSSM Radiator") consisting of two collocated, independently fed, orthogonally polarized (i.e., H-V or RHCP-LHCP) RF radiators and an SPDT RF switch that includes: a common RF Port (the "OSSM Feed") that is coupled to a spatial stream either originating at a MIMO transmitter or destined to a MIMO receiver; $1^{st}$ RF Port that is coupled to one of the orthogonally polarized RF radiators in the antenna element above; $2^{nd}$ RF Port that is coupled to the other RF radiator in the antenna element above; and a Control Port (the "OSSM Control") that is connected to a binary polarization control signal originating at either a MIMO transmitter or a MIMO receiver.

3. "OSSM Mux Method" further comprising:

3a. generating a plurality n of RF spatial streams from the Originating Data Stream above using n/m distinct (Tx) MIMO Xcvrs above;

3b. coupling each spatial stream to each of n distinct OSSM Apparatus comprising an $n^{th}$ order OSSM-capable transmitter (the "OSSM Tx");

3c. applying a distinct $n^{th}$ order orthogonally coded binary signal to the OSSM Control ports of the n distinct OSSM Apparatus comprising the OSSM Tx above; and 3d. radiating a distinct, time-varying polarized RF spatial stream (an "OSSM Stream") from each of the n OSSM Apparatus comprising the OSSM Tx above, such that each OSSM Stream manifests as time-varying polarization orthogonal to the n−1 other OSSM Streams.

4. "OSSM Demux Method" further comprising:

4a. receiving a plurality n of OSSM Streams at n distinct OSSM apparatus incorporated with n/m distinct MIMO Xcvrs above into an $n^{th}$ order OSSM-capable radio receiver (the "OSSM Rx");

4b. applying distinct $n^{th}$ order orthogonally coded binary signals to the OSSM Control ports of the n distinct OSSM apparatus comprising the OSSM Rx above. The identical polarization control signal M applied to the $m^{th}$ OSSM Tx apparatus is applied to the corresponding $m^{th}$ OSSM Rx apparatus in order to effectively "polarization filter" and pass the $m^{th}$ OSSM Stream along to the (Rx) MIMO Xcvr, and effectively block the n−1 other OSSM Streams; and 4c. coupling the output of each of the n OSSM apparatus to the (Rx) MIMO Xcvr, wherein the n distinct RF spatial streams are demodulated and aggregated into a single output Rx Data Stream corresponding identically to the Originating Data Stream originally wirelessly communicated. With OSSM lifting the m=2 maximum constraint, the Originating Data Stream will now support a data transfer rate equal to m×R.

In an embodiment, apparatus and methods for arbitrarily large data transfer rate multiplication in emerging WiFi-6 networks comprise:

1. n×2 commercial WiFi-6 8×8 MIMO transceivers (a "WiFi Xcvr"). Each WiFi Xcvr can process 1201 Mbps of input data into a single (MCS11) 160 MHz spatial stream, and is capable of generating 8 such spatial streams;

2. n×16 OSSM Apparatus as described above.

3. configuring n WiFi Xcvrs into the (Tx) MIMO Xcvr referenced above and coupling them to n×8 distinct OSSM Apparatus to produce an n×8 stream OSSM Tx.

4. applying the method above to the OSSM Tx immediately above converts n×8×1201 Mbps of input data into n×8 OSSM streams;

5. configuring n WiFi Xcvrs into the (Rx) MIMO Xcvr referenced in above and coupling them to n×8 distinct OSSM Apparatus to produce an n×8 stream OSSM Rx; and 6. applying the method of above to the OSSM Rx immediately above to receive, separate, recover, demodulate and then aggregate the n×8 OSSM streams from the OSSM Tx into n×8×1201 Mbps of data transfer. Note that current Spatial Multiplexing technology employing only the identical WiFi Xcvrs above can only deliver a maximum 4×1201=4804 Mbps of data transfer, fully 1/(2×n) that of OSSM.

As specific examples of OSSM data transfer rate multiplication in WiFi-6 communications links, $8^{th}$ order (n=1) OSSM would deliver 9608 Mbps, 16th order OSSM would deliver 19.2 Gbps, 24th order OSSM would deliver 28.8 Gbps, 32nd order OSSM would deliver 38.4 Gbps, and so on.

In an embodiment, methods and apparatus for significant data transfer rate multiplication in emerging 5 GmmW networks comprise:

1. 64 commercial 5 GmmW 4×4 MIMO Base Station transmitters ("5 GmmW gNBTx"). Each 5 GmmW gNBTx can process 480 Mbps of input data into a 256-QAM 98 MHz spatial stream, and is able to generate 4 such streams;

2. 8 commercial 5 GmmW 4×4 MIMO User Equipment receivers ("5 GmmW UERx"). Each 5 GmmW UERx can process 1 256-QAM, 98 MHz Spatial stream into 480 Mbps of data transfer, and can process 4 such streams. 8 such devices working in unison could process 32 sufficiently uncorrelated spatial streams into 15.36 Gbps of data transfer.

3. 288 OSSM Apparatus as described above;

4. configuring the 64 5 GmmW gNBTx devices into the (Tx) MIMO Xcvr referenced above and coupling them to 256 distinct OSSM Apparatus to produce an 8× replicated 32-stream OSSM Tx;

5. configuring the 8 5 GmmW UERx devices into the (Rx) MIMO Xcvr referenced above and coupling them to 32 distinct OSSM Apparatus to produce a 32-stream OSSM Rx;

6. applying the method above to the OSSM Tx above to convert 32×480=15,360 Mbps of input data into 32 OSSM Tx streams;

7. applying the method above to the OSSM Rx above to receive, separate, recover, demodulate and then aggregate the 32 OSSM streams from the OSSM Tx into 15.36 Gbps of data transfer. Note that current 5G Spatial Multiplexing technology employing the identical 5 GmmW equipment discussed herein can only deliver a maximum 2×480=960 Mbps of data transfer, fully ¹⁄₁₆ that of OSSM.

The exemplary aspects of the present invention will be understood more fully from the detailed description and from the accompanying drawings of various embodiments of the invention, which, however, should not be taken to limit the invention to the specific embodiments, but are for explanation and understanding only. For example, the embodiments described herein refer only to vertical and horizontal polarization methods. The invention functions equivalently without limitation when instead employing right hand and left hand circularly polarized (e.g., RHCP and LHCP) polarization techniques Methods and apparatus for orthogonal stream spatial multiplexing ("OSSM") in wireless communications are disclosed. In one embodiment, an OSSM method includes splitting and modulating an originating data stream into n MIMO RF spatial streams and coupling them to corresponding switchable polarization antenna elements controlled via orthogonal binary codes (the OSSM apparatus) for transmission, wherein each individual transmitted stream manifests as time-varying-polarization-orthogonal to the other n−1 spatial streams. The method concludes with reception of the streams at their destination using corresponding OSSM apparatus controlled by the same set of orthogonal binary codes. In this fashion each of the n transmitted spatial streams is polarization-match-filtered, unambiguously separated and individually recovered from all the others upon reception for subsequent demodulation and MIMO spatial recombination into the originating data stream. The methods and apparatus described herein apply to arbitrarily large values of n, meaning that n MIMO spatial streams emanating from a common source and featuring equal amplitude and bandwidth but bearing distinct data and exhibiting mutually orthogonal time varying polarization will propagate mutually interference-free on the same frequency channel to a single destination. Otherwise stated, an $n^{th}$ order OSSM method and apparatus can multiply a communications link's data transfer rate by that arbitrarily large value of n.

While particular embodiments of the present invention have been shown and described, it will be obvious to those skilled in the art that, based upon the teachings herein, that changes and modifications may be made without departing from these exemplary embodiments of the present invention and its broader aspects. Therefore, the appended claims are intended to encompass within their scope all such changes and modifications as are within the true spirit and scope of this exemplary embodiments of the present invention.

What is claimed is:

1. An apparatus, comprising:
   three or more transmit antenna circuits connected to receive three or more co-channel, identically modulated and equal amplitude RF spatial streams and three or more time-varying orthogonal polarization control signals, respectively, such that the three or more co-channel, identically modulated and equal amplitude RF spatial streams are mutually, orthogonally and time-varying polarized in order to be transmitted concurrently and free of mutual interference, wherein each co-channel, identically modulated and equal amplitude RF spatial streams is associated with a corresponding time-varying orthogonal polarization control signals, and wherein each transmit antenna circuit comprises:
   first and second orthogonally polarized transmit antenna elements; and a RF switch that selectively connects a selected stream to the first and second orthogonally polarized RF transmit antenna elements based on a corresponding varying orthogonal polarization control signal;
   wherein the RF switch comprises an input port, a control port, and two output ports;
   the RF switch receives a spatial stream of RF data to be transmitted at the input port based on the corresponding varying orthogonal polarization control signal received at the control port;
   wherein the corresponding varying orthogonal polarization control signal comprises a binary stream of control bits where each bit determines whether the input port is connected to the first output port or the second output port.

2. The apparatus of claim 1, wherein the first and second orthogonally polarized transmit antenna elements are configured to provide one of horizontal and vertical orthogonality or right-hand circular polarization (RHCP) and left-hand circular polarization (LHCP) orthogonality.

3. The apparatus of claim 1, further comprising a MIMO transmitter that outputs the three or more spatial streams and the three or more time-varying orthogonal polarization control signals.

4. The apparatus of claim 3, wherein the MIMO transmitter comprises a spatial multiplexer that generates the three or more spatial streams from a single transmit data stream.

5. The apparatus of claim 1, further comprising a code generator that generates the three or more time-varying orthogonal polarization control signals.

6. The apparatus of claim 1, further comprising sync logic that synchronizes the three or more time-varying orthogonal polarization control signals with a transmit payload.

7. The apparatus of claim 1, wherein each transmit antenna circuit radiates a distinct, time-varying polarized RF spatial stream, such that each stream comprises time-varying polarization that is orthogonal to other streams in order to enable concurrent, mutual-interference-free wireless propagation of the three or more streams.

8. An apparatus, comprising:
   three or more receive antenna circuits that each receive three or more co-channel, identically modulated and equal amplitude RF spatial streams and a distinct one of three or more time-varying orthogonal polarization control signals, respectively, wherein each RF spatial stream is associated with a corresponding time-varying orthogonal polarization control signal, and wherein each receive antenna circuit comprises:
   first and second orthogonally polarized receive antenna elements; and
   an RF switch that selectively connects outputs of the first and second orthogonally polarized RF receive antenna elements to a receiver based on the corresponding time-varying orthogonal polarization control signal;
   wherein the RF switch comprises an output port, a control port, and two input ports;
   wherein the the three or more receive antenna circuits receives RF signals and inputs these RF signals to the second input port of the RF switch based on the corresponding time-varying orthogonal polarization control signal received at the control port;
   wherein the corresponding time-varying orthogonal polarization control signal comprises a binary stream of control bits, each bit determines whether the first input port or the second input port is connected to the output port.

9. The apparatus of claim 8, wherein each of the three or more streams comprises distinct, time-varying polarization that is orthogonal to that of other streams.

10. The apparatus of claim 8, wherein each of the three or more first and second orthogonally polarized RF receive antenna elements are configured to provide one of horizontal and vertical orthogonality or right-hand CP and left-hand CP orthogonality.

11. The apparatus of claim 10, wherein the receiver comprises:
    a demodulator that demodulates the three or more RF spatial streams; and
    a spatial demultiplexer that aggregates the three or more spatial streams to generate a single received data stream.

12. The apparatus of claim 10, further comprising a code generator that generates the three or more time-varying polarization control signals.

13. The apparatus of claim 10, further comprising sync logic that synchronizes the three or more time-varying polarization control signals with a received payload.

14. A method, comprising:
    radiating three or more orthogonally time-varying polarized RF spatial streams from three or more corresponding transmit antennas in order to propagate their concurrent, mutual-interference free transmission, wherein each one of the three or more orthogonally time-varying polarized RF spatial streams is switched between first and second orthogonally polarized RF transmit antenna elements of a selected corresponding transmit antenna based on a corresponding orthogonal time-varying polarization control signal, wherein the corresponding orthogonal time-varying polarization control signal comprises a binary stream of control bits where each bit determines whether a selected one of the three or more orthogonally time-varying polarized RF spatial streams is connected to the first orthogonally polarized RF transmit antenna elements or the second orthogonally polarized RF transmit antenna elements so that each orthogonally time-varying polarized RF spatial streams is orthogonal to that of other orthogonally time-varying polarized RF spatial streams; and receiving the three or more orthogonally time-varying polarized RF spatial streams at each of three or more receive antennas, wherein each of the three or more receive antennas comprises first and second orthogonally polarized receive antenna elements having outputs that are selectively connected to a receiver to match time-varying polarization of a selected received RF stream, wherein the first and second orthogonally polarized RF receive antenna elements of each receive antenna are selectively connected to the receiver based on a corresponding time-varying polarization control signal, wherein the corresponding time-varying polarization control signal comprises a binary stream of control bits where each bit determines whether a selected one of the first and second orthogonally polarized RF receive antenna element is connected to the receiver, wherein each receive antenna is time-varying orthogonally polarization-filtered to pass only one of the three or more orthogonally time-varying polarized RF spatial streams in order to consummate a concurrent, mutual interference free transmission of that RF streams.

15. The method of claim 14, further comprising configuring first and second orthogonally polarized antenna elements of each of the three or more receive antennas to provide one of vertical and horizontal polarization or right-hand circular polarization (RHCP) and left-hand circular polarization (LHCP).

16. The method of claim 15, further comprising utilizing an RF switch to selectively connect outputs of the first and second orthogonally polarized antenna elements to the receiver based on a time-varying orthogonal polarization control signal associated with the selected received RF spatial stream.

17. The method of claim 14, further comprising:
demodulating digital streams from the RF spatial streams output from each receive antenna; and
aggregating the digital streams to form a received data stream.

18. The method of claim 14, wherein the operation of radiating comprises transmitting the three or more RF spatial streams from three or more transmit antennas, wherein each transmit antenna comprises first and second orthogonally polarized antenna elements having inputs that are selectively connected to a selected RF spatial stream based on a time-varying orthogonal polarization control signal in order to transmit three or more orthogonally time-varying polarized streams that propagate concurrently and free of interference from each other.

19. The method of claim 18, wherein the operation of radiating further comprises receiving the three or more RF spatial streams and three or more time-varying orthogonal polarization control signals from a MIMO transmitter.

20. The method of claim 14, further comprising utilizing an RF switch to selectively connect the selected RF spatial stream to the first and second orthogonally polarized antenna elements based on the time-varying orthogonal polarization control signal.

* * * * *